(12) United States Patent
Lindbom et al.

(10) Patent No.: US 10,341,151 B2
(45) Date of Patent: Jul. 2, 2019

(54) METHODS AND DEVICES FOR REDUCTION OF CUBIC METRIC IN A CONCATENATED BLOCK REFERENCE SIGNAL DESIGN

(71) Applicant: TELEFONAKTIEBOLAGET LM ERICSSON (PUBL), Stockholm (SE)

(72) Inventors: Lars Lindbom, Karlstad (SE); Robert Baldemair, Solna (SE); Martin Hessler, Linköping (SE); Stefan Parkvall, Bromma (SE)

(73) Assignee: TELEFONAKTIEBOLAGET LM ERICSON (PUBL), Stockholm (SE)

( * ) Notice: Subject to any disclaimer, the term of this patent is extended or adjusted under 35 U.S.C. 154(b) by 233 days.

(21) Appl. No.: 15/325,837

(22) PCT Filed: Jul. 1, 2016

(86) PCT No.: PCT/SE2016/050678
§ 371 (c)(1),
(2) Date: Jan. 12, 2017

(87) PCT Pub. No.: WO2017/164789
PCT Pub. Date: Sep. 28, 2017

(65) Prior Publication Data
US 2017/0302489 A1 Oct. 19, 2017

Related U.S. Application Data

(60) Provisional application No. 62/312,437, filed on Mar. 23, 2016.

(51) Int. Cl.
*H04L 27/26* (2006.01)
*H04L 5/00* (2006.01)
(Continued)

(52) U.S. Cl.
CPC ......... *H04L 27/2613* (2013.01); *H04B 7/208* (2013.01); *H04L 5/0051* (2013.01);
(Continued)

(58) Field of Classification Search
None
See application file for complete search history.

(56) References Cited

U.S. PATENT DOCUMENTS

2010/0173642 A1* 7/2010 Iwai .................... H04J 13/0062
455/450
2011/0141982 A1* 6/2011 Zhang ................. H04J 13/0062
370/329

(Continued)

OTHER PUBLICATIONS

Etri, "RS and multiplexing structure of uplink ACK/NAK channels," 3GPP TSG RAN WG1 Meeting #49bis, R1-072815, Jun. 25-29, 2007, Orlando, FL, US.

(Continued)

*Primary Examiner* — Chi H Pham
*Assistant Examiner* — Vladislav Y Agureyev
(74) *Attorney, Agent, or Firm* — Patent Portfolio Builders PLLC

(57) ABSTRACT

Method and devices determine parameters governing a concatenated reference signal design based on Zadoff-Chu sequences and having a limited correlation with other reference signals arriving at a same transmission point, wherein the concatenated reference signal has a controlled cubic metric. The cubic metric control is achieved by selecting base sequence root indices, phase shifts and/or block configurations in view of information related to the other reference signals.

32 Claims, 8 Drawing Sheets

(51) Int. Cl.
  *H04B 7/208* (2006.01)
  *H04L 5/02* (2006.01)
  *H04W 72/04* (2009.01)
  *H04W 74/00* (2009.01)

(52) U.S. Cl.
  CPC ............ *H04L 5/023* (2013.01); *H04L 27/261* (2013.01); *H04L 27/262* (2013.01); *H04W 72/042* (2013.01); *H04W 72/0413* (2013.01); *H04W 74/004* (2013.01)

(56) References Cited

U.S. PATENT DOCUMENTS

| | | | |
|---|---|---|---|
| 2012/0087427 A1* | 4/2012 | Noh | H04B 7/0613 375/260 |
| 2012/0163318 A1* | 6/2012 | Kishiyama | H04B 7/0671 370/329 |
| 2013/0039163 A1* | 2/2013 | Heo | H04L 5/0016 370/208 |
| 2013/0114756 A1* | 5/2013 | Jia | H04J 11/00 375/295 |
| 2013/0155864 A1* | 6/2013 | Yoshizawa | H04W 4/08 370/235 |
| 2013/0223360 A1* | 8/2013 | Tabet | G06F 17/141 370/329 |
| 2014/0254530 A1* | 9/2014 | Kim | H04L 5/0019 370/329 |
| 2014/0321406 A1* | 10/2014 | Marinier | H04B 7/024 370/329 |
| 2014/0355710 A1* | 12/2014 | Takata | H04L 5/0051 375/267 |
| 2015/0009847 A1* | 1/2015 | Iwai | H04J 13/22 370/252 |
| 2015/0236839 A1* | 8/2015 | Shah | H04W 72/042 370/329 |
| 2015/0372780 A1* | 12/2015 | Qu | H04B 7/022 375/140 |
| 2016/0359594 A1* | 12/2016 | Inoue | H04L 1/1671 |
| 2017/0127426 A1* | 5/2017 | Karsi | H04W 24/02 |
| 2017/0181011 A1* | 6/2017 | Yu | H04L 27/2601 |
| 2018/0205515 A1* | 7/2018 | Wu | H04W 72/04 |

OTHER PUBLICATIONS

International Search Report and Written Opinion dated Nov. 28, 2016 in related International Application No. PCT/SE2016/050678.
ZTE, "Details on NB-RS for NB-IoT," 3GPP TSG RAN WG1 Meeting #84, R1-160475, Feb. 15-19, 2016, St Julian's, MT.

* cited by examiner

METHODS AND DEVICES FOR REDUCTION OF CUBIC METRIC IN A CONCATENATED BLOCK REFERENCE SIGNAL DESIGN

TECHNICAL FIELD

Embodiments of the subject matter disclosed herein generally relate to reference signals in a wireless communication network, and, more particularly, to designing segmented reference signals based on Zadoff-Chu (ZC) sequences so as to reduce their cubic metric.

BACKGROUND

In releases of mobile communication standard Long Term Evolution, code division multiplexing of reference signals derived from ZC sequences require reference signals to be based on same base sequences in order to achieve orthogonality. A consequence of this design is that data transmissions on different multiple-input multiple-output (MIMO) layers cannot partly overlap without introducing cross-layer interference when performing channel estimation. In forthcoming 5G (LTE Evolution together with new radio-access technology) systems using massive MIMO and excessive multi-user MIMO, such design would result in either severe pilot contamination or hard scheduling restrictions by not allowing different MU-MIMO users' data transmissions to partly overlap.

Conventional methods that provide low cubic metric and good inter-cell correlation properties do not support partially overlapping users. In the conventional methods, either good cubic metric or good inter-cell correlation properties must be sacrificed in order to support partially overlapping users.

It is desirable to develop methods for scheduling partially overlapping users while maintaining good cubic metric properties of the reference signals.

SUMMARY

In various embodiments described in this disclosure, a transmission-point-specific function determines a concatenated reference signal by assigning for at least one segment a base sequence index and optionally a phase shift (e.g., derived from ZC sequences). It is noted that assigning a trivial phase shift (e.g., a phase shift by zero units, or a neutral phase shift) is equivalent to the function not assigning any phase shift. While the embodiments are not limited to downlink transmission, the function differs from conventional downlink approaches because all users in the same transmission point use a common cyclic shift-hopping pattern and/or the same or different base sequence per segment. That is, within each segment, all wireless devices must use the same base sequence, but the RSs as a whole are subject to user-specific different cyclic shifts if they are to be orthogonal. For different segments in the bandwidth, one may use the same ZC sequence (repeatedly), or one may use a new ZC sequence for each new segment. It is emphasized that orthogonality between base sequences mapped to different sets of frequencies is no essential feature of the present invention, although low or limited correlation between the sequences may be a desirable property. Relaxing an orthogonality condition to ensuring low or limited correlation affords greater latitude for decision-making elsewhere in the system.

In some embodiments, transmission-point-specific functions of two different and interfering transmission points are chosen so that the respective hopping patterns are pairwise pseudo-random and/or that base-sequence patterns are non-overlapping or pseudo-random. By non-overlapping, two interfering transmission points do not share the same base sequence for the same blocks. Such improvement of pair-wise properties for interfering transmission points is not possible if different transmission points can select different reference signal segments lengths autonomously. Hence, in such an embodiment, coordinated transmission points have the same block reference signal structure. This type of improvement is not supported by conventional methods.

According to an embodiment there is a method performed by a network device in a wireless network. The method includes determining parameters for generating first segments of a first reference signal (RS). Each of the first segments covers a distinct set of frequencies. The parameters include at least a base sequence root index for one of the first segments. The parameters are determined using information about at least a second RS which is to be received substantially simultaneously with the first RS at a transmission point of the wireless network. The parameters are determined such that to limit correlation between the first RS and the second RS. The method further includes providing the parameters to generate the first RS including the first segments.

According to another embodiment, there is a network device including a communication interface configured to transmit and receive data via a wireless network and a processing unit connected to the communication interface and including at least one processor. The processing unit is configured to determine parameters for generating first segments of a first RS. Each of the first segments covers a distinct set of frequencies. The parameters include at least a base sequence root index for one of the first segments. The parameters are determined using information about at least a second RS which is to be received substantially simultaneously with the first RS at a transmission point of the wireless network. The parameters are determined such that to limit correlation between the first RS and the second RS. The processing unit is also configured to provide the parameters for generating the first RS including the first segments.

According to another embodiment there is a network device in a wireless network includes an RS design module and a delivery module. The RS design module determines parameters of first segments of a first RS using information about at least a second RS which is to be received substantially simultaneously with the first RS at a transmission point of the wireless network. The parameters are determined such that to limit correlation between the first RS and the second RS. The delivery module provides the parameters to generate the first RS including the first segments.

According to an embodiment there is a method for a wireless device in a communication network. The method includes receiving parameters for generating a first RS from a network device. The method further includes generating and transmitting the first RS by concatenating first segments generated according to the parameters that include at least a base sequence root index determined for at least one among the first segments. The parameters have been determined using information about at least a second RS, which is to be received substantially simultaneously with the first RS at a transmission point of the wireless network, such that to limit correlation between the first RS and the second RS.

According to another embodiment there is a wireless device in a communication network including a communication interface configured to transmit a first RS, and to receive parameters related to generating the first RS from a network device, and a processing unit connected to the communication interface. The processing unit is configured to generate the first RS by concatenating first segments according to the parameters that include at least a base sequence root index determined for one segment among the first segments. The parameters have been determined using information about at least a second RS, which is to be received substantially simultaneously with the first RS at a transmission point of the wireless network, such that to limit correlation between the first RS and the second RS.

According to yet another embodiment, there is a wireless device in a communication network including a receiver module for receiving parameters related to generating a first RS, from a network device, and an RS generating module. The RS generating module is for generating and transmitting the first RS by concatenating first segments according to the parameters that include at least a base sequence root index determined for one among the first segments. The parameters have been determined using information about at least a second RS, which is to be received substantially simultaneously with the first RS at a transmission point of the wireless network, such that to limit correlation between the first RS and the second RS.

BRIEF DESCRIPTION OF THE DRAWINGS

The accompanying drawings, which are incorporated in and constitute a part of the specification, illustrate one or more embodiments and, together with the description, explain these embodiments. On the drawings.

DETAILED DESCRIPTION

Figure 1:
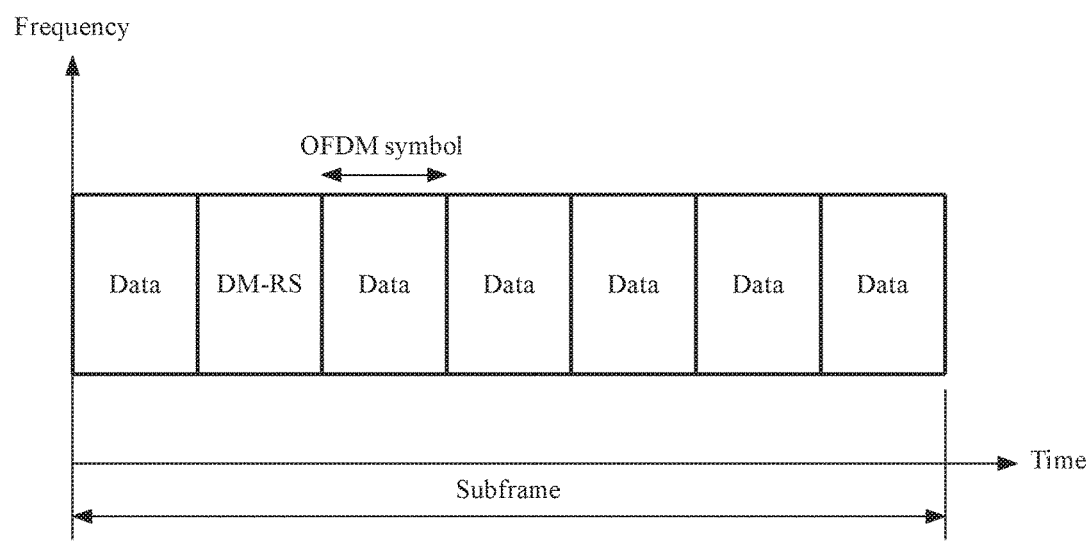
FIG. 1 illustrates a possible 5G subframe with DM-RS time-multiplexed with data transmissions.

The following description of the embodiments refers to the accompanying drawings. The same reference numbers in different drawings identify the same or similar elements. The following detailed description does not limit the invention. Instead, the scope of the invention is defined by the appended claims. The embodiments are described for a wireless communication network, which may be, but is not, limited to the 5G system under development at this time.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The following abbreviations are used in this document:
CSI Channel State Information
DCI Downlink Control Information
DFT Discrete Fourier Transform
CM Cubic Metric
DM-RS Demodulation Reference Signals
FDM Frequency Division Multiplexing
FDMA Frequency Division Multiple Access
MIMO Multiple Input Multiple Output
MU-MIMO Multi-User MIMO
OFDM Orthogonal Frequency Division Multiplex
PA Power amplifier
PAPR Peak-to-Average Power Ratio
SU-MIMO Single-User MIMO
ZC Zadoff-Chu.

Waveforms with low amplitude variation (as may be measured by low PAPR and/or low CM) are desirable when designing wireless systems to achieve high operation efficiency of PAs. A waveform (i.e., a time-dependent signal) with a higher PAPR/CM has larger amplitude variations at the input to the power amplifier and, therefore, may be more exposed to clipping of the signal when the PA operates near its maximum output transmission power. The clipping causes in-band signal distortion as well as out-of-band spurious emissions that degrade the wireless system's performance. Furthermore, a more complex or costly PA may be required if non-linear behavior is to be ensured over a larger input amplitude range. In order to avoid impairments due to clipping, one could either (1) increase the linearity requirements on the PA, or (2) back off the transmit power to reduce the probability of clipping. Requiring higher PA linearity results in significant cost increase. Backing off the transmit power reduces transmission coverage. Hence, it is highly desirable to keep the waveforms' PAPR/CM as low as possible, or at least below a predefined limit. The predefined limit may be determined by balancing factors such as acceptable device cost, acceptable performance, acceptable latency, and available computational capacity.

Waveforms used in LTE refer to a multi-carrier OFDM signal generation in downlink and a DFT precoded OFDM signal generation in uplink. The OFDM scheme provides great flexibility in resource utilization, but has the drawback of having waveforms with higher CM in comparison to the DFT precoded OFDM. A symmetrical waveform design for downlink and uplink is currently considered in preparatory work for 5G systems, with OFDM in downlink and non-precoded OFDM in uplink. In an OFDM system, it can be beneficial to time-multiplex reference signals (RS) of low cubic metric with data to enable power-boosting of the RS and, by doing so, to improve the channel estimation at, e.g., the cell edge.

FIG. 1 illustrates a downlink/uplink subframe structure proposed for 5G and represented within frequency-versus-time coordinates. This structure includes seven OFDM symbols, a demodulation reference signal (DM-RS) symbol being time-multiplexed with six data transmissions. As in LTE, DM-RS is transmitted to aid coherent channel estimation for data demodulation, but in contrast to LTE, it is being proposed that the DM-RS in 5G occur only within one OFDM symbol of the subframe.

Uplink reference signals used for demodulation and sounding in LTE are constructed from Zadoff-Chu (ZC) sequences. These sequences are known to have many desirable properties for good reference signal design, such as being sequences with constant amplitude and zero autocorrelation, as well as having low cubic metrics. A ZC sequence with root index q is in LTE generated as:

$$Z_q(k) = e^{-j2\pi q \frac{k(k+1)/2}{N_{ZC}}} \quad (1)$$

with k=0, 1, . . . , $N_{ZC}$−1, and q∈{1, 2, . . . , $N_{ZC}$−1}.

The length of the ZC sequence, $N_{ZC}$, may be selected as the largest prime number related to the block/segment size, $N_{RS}$, the number of subcarriers allocated for DM-RS. If $N_{ZC} < N_{RS}$, the ZC sequence can be cyclically extended as:

$$X_q(k) = Z_q(k \bmod N_{ZC}) \quad (2)$$

with k=0, 1, . . . , $N_{RS}$−1.

The alternative to extending the ZC sequence cyclically is truncation of a longer ZC sequence, i.e., $N_{ZC} > N_{RS}$. That is, the length of the ZC sequence $N_{ZC}$ may be selected as a prime number larger than the block/segment size $N_{RS}$ (e.g., $N_{ZC}$ may be the smallest prime number larger than $N_{RS}$) and the ZC sequences are then truncated. This is the second way in which a ZC sequence length may be related to the block/segment size.

ZC sequences are considered for use in 5G for RS design of demodulation RS in uplink due to their good cubic metric properties. ZC sequences are also considered for use in downlink, to have symmetrical design.

In order to support multi-layer transmissions (i.e., SU-MIMO and MU-MIMO), DM-RS transmitted per layer should preferably be mutually orthogonal so that cross-layer interference can be avoided when performing MIMO channels estimation. For ZC-based RS design, orthogonality is enabled by multiplying the cyclically-extended ZC sequences (a.k.a., base sequences) with cyclic phase rotations, where each layer is assigned its own phase shift out of M supported shifts, i.e., $$\overline{X}_{q,m}(k) = X_q(k) \cdot e^{j\alpha_m k} \quad (3)$$

where $$\alpha_m = 2\pi \frac{m}{M}$$

and m∈{0, 1, . . . , M−1}. As pointed out above, the assigned phase shifts may include the neutral phase shift for m=0.

Figure 2:
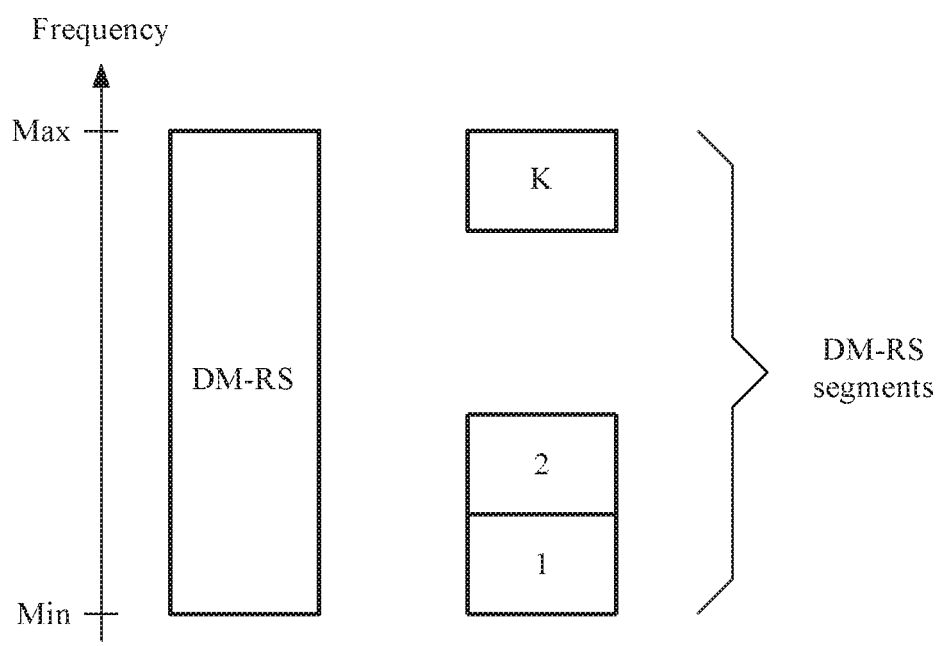
FIG. 2 illustrates DM-RS scheduling bandwidth divided into K segments.

In this design, exact orthogonality between the RS holds only if the cyclic phase rotations are applied to the same base sequence. In other words, DM-RS derived from ZC sequences of different lengths, or derived from ZC sequences with different root indices, are not orthogonal although they have been assigned different cyclic shifts. It is first of all noted that orthogonality (e.g., an inner product of the DM-RS sequences being equal to zero exactly or deviating to zero less than the system accuracy) is by no means required for the present invention, and may in embodiments be replaced by limited cross-correlations. To obtain orthogonality via cyclic-shifting, the DM-RSs have to be of same lengths, be mapped on the same frequency resources and be derived from the same root index. FIG. 2 illustrates DM-RS scheduling bandwidth divided into K DM-RS segments.

A drawback of ZC-based orthogonal DM-RS design in LTE is that it constrains the scheduler (e.g., in MU-MIMO operations) in that DM-RS transmissions of layers from different users cannot partly overlap if orthogonality across DM-RS is to be preserved. To mitigate this scheduling restriction in MU-MIMO data transmissions, one proposed approach in the context of 5G is to divide the DM-RS transmissions into smaller blocks in such a way that overlapping DM-RS associated with the same base sequence preserve orthogonality independently if DM-RS refer to the same or different transmission bandwidths. This approach is different from LTE, where the base sequence's length is the scheduled data bandwidth.

Figure 3:
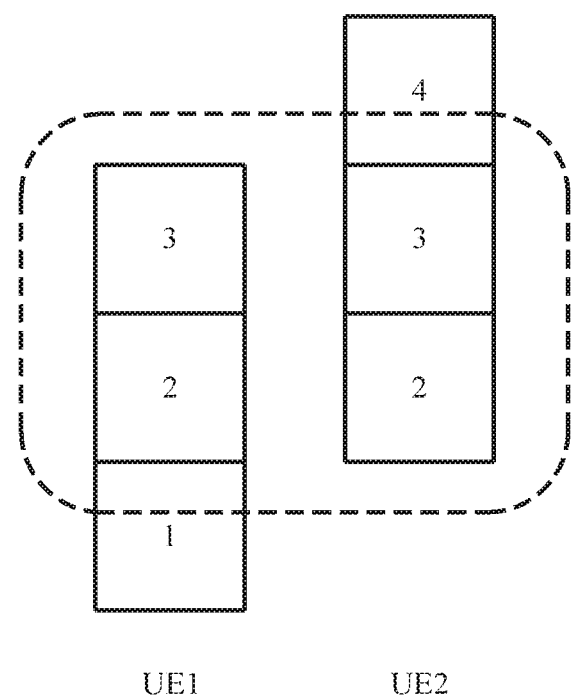
FIG. 3 illustrates partly overlapping bandwidths configured for two UEs.

FIG. 3 illustrates a design with concatenation of piecewise orthogonal DM-RS where two UEs (UE1 and UE2) have partly overlapping bandwidths, as indicated by the dashed-line rectangle. When the base sequences of segment numbers 2 and 3 are derived from the same ZC root index, piecewise orthogonality can be obtained by assigning different cyclic phase rotations.

A consequence of concatenating ZC sequences is that the cubic metric can be significantly increased in comparison to LTE design unless the sequences to be concatenated into one RS sequence are properly configured.

Figure 4:
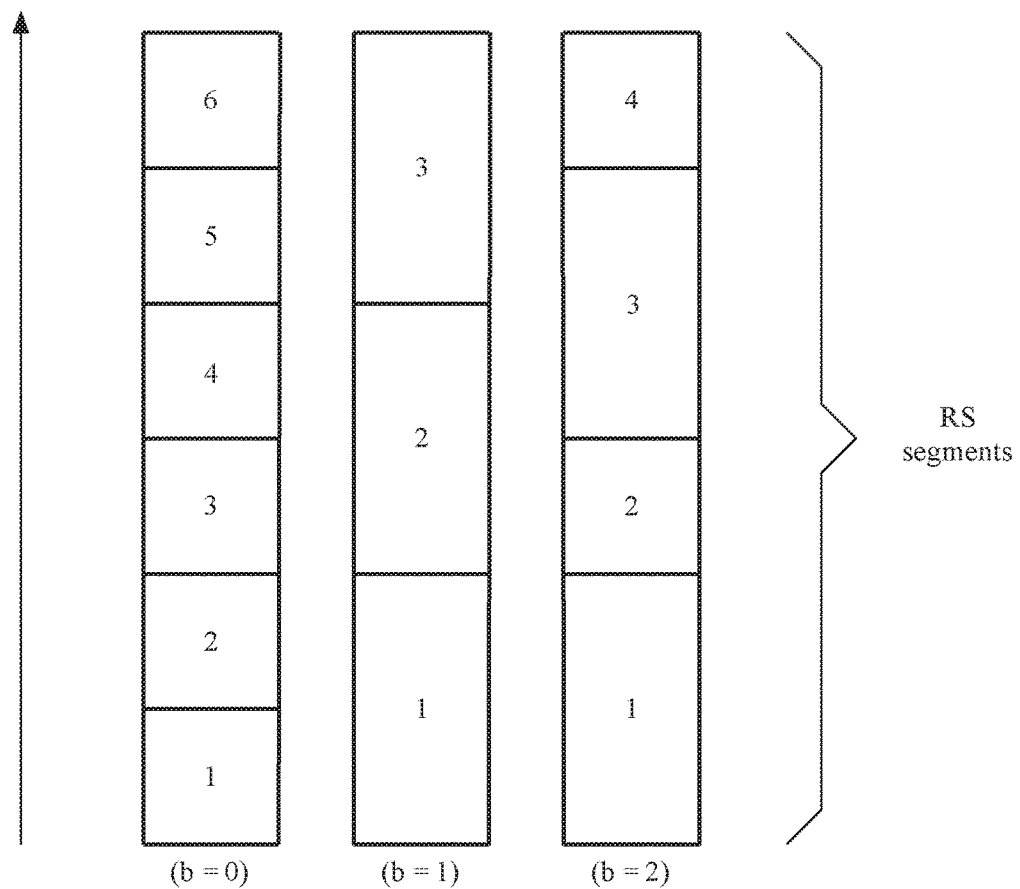
FIG. 4 shows examples of RS block structures.

A UE is operating with one or multiple RS block structures, e.g., configured by the network via higher-layer signaling to operate or the structure is derived from some other (system-specific) quantity available in the UE. A block RS structure is here defined by a number of RS segments with lengths given by the number of allocated subcarriers. FIG. 4 illustrates three different block structures in which two of the structures use equally sized segments, but are of different lengths, whereas in the figure's right-most RS block structure there is a mixture of segments with different lengths. The segments typically cover the whole system bandwidth but can be configured to only partly span it. When the network operates with multiple RS block structures, the one used in a particular transmission could be dynamically indicated via physical layer control signaling or be indicated implicitly via a subframe index. In the following, the length of the i$^{th}$ RS segment of the block RS structure bis denoted as $N_{B,i}^{(b)}$. A transmission point may use one block RS structure (one b value) at a time.

The transmission of demodulation RS (DM-RS) is always associated with transmission of physical layer data channels, or physical layer control channels, and the DM-RS segments that are part of such transmissions are implicitly given by the resource allocation of the data/control. In transmissions of RS for acquisition of Channel State Information, CSI (i.e., RS transmissions not necessarily associated with any data/control transmissions), the RS segments used for a particular transmission are explicitly indicated via assignments/grants or are semi-statically configured via higher-layer signaling.

Transmissions of RS do not necessarily imply that an RS sequence is consecutively mapped on subcarriers with an RS segment. One example of a non-consecutive mapping of RS on subcarriers is when interleaved FDM/FDMA (also known as combs) is used. With combs, a segment's RS sequence is mapped on every C$^{th}$ subcarrier, which implies that the actual sequence length mapped to the segment is $N_{B,i}^{(b)}/C$. The particular comb to map the RS sequence on is indicated either dynamically via assignments or grants, or provided semi-statically via higher-layer signaling. In multi-layer RS transmissions, some of the layers might be transmitted on different combs, whereas other layers might be separated via code division.

When the RS refer to base sequences derived from Zadoff-Chu sequences, the configuration of the UE includes assigning sets of ZC root indices, $q_i^{(b)}$, and sets of ZC sequence lengths, $N_{ZC,i}^{(b)}$. Index b refers to the block RS structure currently to be used, as in FIG. 4. In general, these parameters are given per block RS structure and per RS segment, but could alternatively be related to a segment index i only. The configuration of $N_{ZC,i}^{(b)}$ can either be explicitly signaled or be given implicitly by sequence lengths of the segments, i.e., $N_{B,i}^{(b)}/C$. In the latter case, $N_{ZC,i}^{(b)}$ could, for example, be the highest prime number less than or equal to $N_{B,i}^{(b)}/C$ (i.e., a prime number related to $N_{B,i}^{(b)}/C$ in the sense previously discussed). If truncated ZC sequences are used instead of cyclically extended ZC sequences, the value of $N_{ZC,i}^{(b)}$ will be larger than $N_{B,i}^{(b)}/C$. In that case, $N_{ZC,i}^{(b)}$ could implicitly refer to the prime number that is larger and nearest $N_{B,i}^{(b)}/C$. Also, the configuration of $q_i^{(b)}$ can either be explicitly signaled or be assigned implicitly, e.g., via $N_{ZC,i}^{(b)}$, the number of RS segments, $K^{(b)}$, and an integer parameter P, either part of the UE configuration or a value given by specification. One example of an implicit assignment of $q_i^{(b)}$ is:

$$q_i^{(b)} = 1 + (i \cdot P) \bmod (N_{zc,i}^{(b)} - 1) \quad (4)$$

where i=1, 2, ..., $K^{(b)}$.

In the subsequent detailed description of embodiments, the superscript (b) is omitted for simplicity with the understanding that a UE can be configured with multiple block RS structures.

To support multi-layer transmissions via code division, the UE can also be configured with a set of evenly spaced cyclic phase shifts, i.e., $\{\alpha_m = 2\pi m/M\}$ where $m \in \{0, 1, \ldots, M-1\}$, which is common for all RS segments. Each UE has a supply of allowed m values and is informed about which to use by reading a UE-specific DCI (grant/assignment).

The specific cyclic phase shifts used in RS transmissions are dynamically indicated via assignments and grants, or alternatively they are semi-statically configured. The assigned phase shifts can either be applied directly to a base sequence associated with an RS segment, or a segment-specific phase shift offset can be pre-added. One method to apply phase shift offsets is to assign integers $L_i$ per segment and determine the modified phase shifts such that they belong to the set $\{2\pi/M\}_{m=0}^{M-1}$, e.g., by determining the modified phase shifts in accordance with:

$$\varphi_{P_i} = 2\pi p_i/M \quad (5)$$

where $p_i = (m + L_i) \bmod M$.

Unlike m (which as seen is set in each DCI), $L_i$ is typically a semi-statically configured parameter. UEs that are to be spatially multiplexed using cyclic shifts (e.g., coordinated multi-user MIMO) may share common $L_i$ values. However, for UEs that are not spatially multiplexed (e.g., uncoordinated transmission) the use of cyclic shifts could create uncoordinated interference and should therefore preferably have different $L_i$ values. When different UEs have different $L_i$ values, the modified phase shifts are pseudo-randomly spread irrespective of the m value, which advantageously keeps the cubic metric limited. Thus, spatial multiplexed UEs may have a common $L_i$ value, but UEs that are not spatially multiplexed via cyclic shifts (i.e., those that could create uncoordinated interference) use different $L_i$ values. In other words, in one embodiment, $L_i$ value is the same for coordinated MU-MIMO users/transmissions, and is different among uncoordinated users/transmissions.

Using $\{X_{q_i}(k), k=0, 1, \ldots, N_{B,i}/C-1\}$ to represent a base sequence derived from a ZC sequence with root index $q_i$, the RS sequence of the $i^{th}$ RS segment can then be expressed as:

$$\overline{X}_{q_i,m}(k) = X_{q_i}(k) e^{j\varphi_{p_i} k} \quad (6)$$

where k=0, 1, ..., $N_{B,i}/C-1$.

The RS block sequences may originate from different base sequences and be of different lengths, but their lengths should be a multiple of M.

In one embodiment, the UE is configured with equally sized RS segments where the same base sequence is used in all segments, i.e., $q_i = q$, and where segment-specific phase shift offsets are added to the set of cyclic phase shifts such that $\varphi_{p_i}$ belongs to the set $\{2\pi m/M\}_{m=0}^{M-1}$. Radio conditions, such as delay spread, and detection accuracy may define an upper limit on the number of available m values in the system.

In another embodiment, the UE is configured with equally sized RS segments and multiple base sequences, where the base sequences are derived from ZC sequences with same lengths, $N_{ZC}$, but where the ZC root indices, $q_i \in \{1, 2, \ldots, N_{ZC}^{(b)})-1\}$, differ. The relation between the $i^{th}$ RS segment and the corresponding base sequence is given by the sub-index of the root index $q_i$. In one version of this embodiment the UE is configured with a set of equally spaced cyclic phase shifts that is common for all RS segments. In another version of this embodiment, segment-specific phase shift offsets are added to the set of cyclic phase shifts such that $\varphi_{p_i}$ belongs to the set $\{2\pi m/M\}_{m=0}^{M-1}$.

In another embodiment, the UE is configured with non-equally sized RS segments, where the same ZC root index is used in all segments, i.e., $q_i = q$, and where segment-specific phase shift offsets are added to the set of cyclic phase shifts such that $\varphi_{p_i}$ belongs to the set $\{2\pi m/M\}_{m=0}^{M-1}$.

In yet another embodiment, the UE is configured with a set of block RS structures that includes both equally and non-equally sized RS segments where the same ZC root index is used in all segments, i.e., $q_i = q$, and where segment-specific phase shift offsets are added to the set of cyclic phase shifts such that $\varphi_{p_i}$ belongs to the set $\{2\pi m/M\}_{m=0}^{M-1}$.

As an alternative to concatenating base sequences, one may construct one long base sequence and divide that sequence into K sub-sequences of equal lengths. In this case, the length of the ZC sequence, $N_{ZC}$, is selected as the largest prime number related to the largest allocation size of the DM-RS, whereas the ZC root index q is selected as the largest prime number related to the length of a sub-sequence. In one embodiment of this solution, segment-specific phase shift offsets are added to the set of cyclic phase shifts such that $\varphi_{p_i}$ belongs to the set $\{2\pi m/M\}_{m=0}^{M-1}$.

Figure 5:
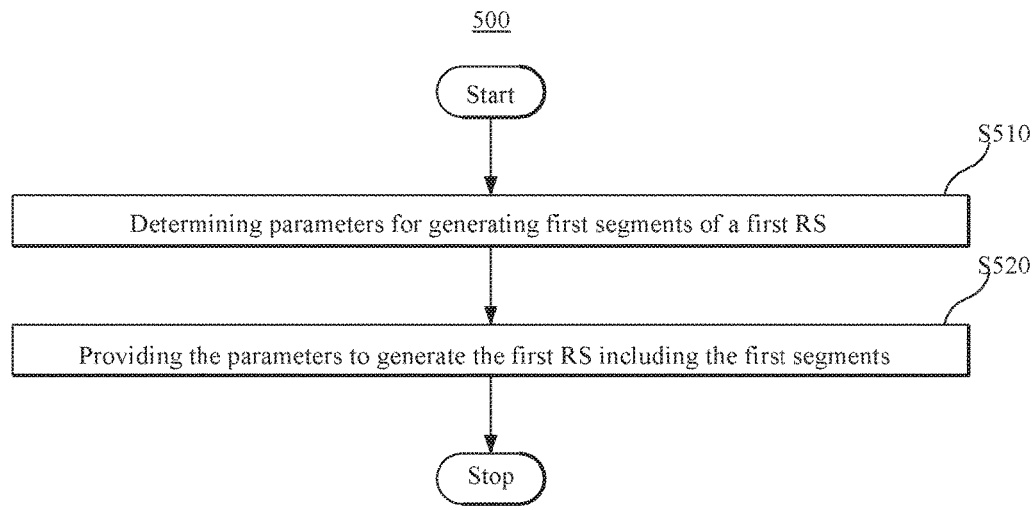
FIG. 5 is a flowchart of a method performed by a network node according to an embodiment.

FIG. 5 is a flowchart of a method 500 performed by a network device in a wireless network according to an embodiment. Method 500 includes determining parameters for generating first segments of a first RS, at S510. Here, each first segment covers a distinct set of frequencies that corresponds to a specific length. The frequencies in the set may be carriers or subcarriers, but given that these methods are intended to be used in 5G, the set of frequencies is not limited by the carriers and subcarriers definitions. Note also that sequence length corresponds to the number of frequencies in the set of frequencies of a segment.

The parameters are determined using information about at least a second RS, which is to be received substantially simultaneously with the first RS at a transmission point of the wireless network. The term "substantially simultaneously" leaves room for minor time delays in RS's arrival times at the transmission point, due to the differences in the propagation paths from different RS sources. In other words, two RSs are received substantially simultaneously, if received within the cyclic prefix length of the network.

The parameters include at least a base sequence root index for one among the first segments. However, the parameters may include base sequence root indices for some or all first segments in the first RS. The parameters may also include a phase shift for the segment for which the base sequence root index is provided, for other or few of the first segments, or even for all the first segments. The parameters are determined such that to limit correlation between the first RS and the second RS. The parameters may also be determined such that to limit the cubic metric or a peak-to-average ratio of the first RS.

Method 500 further includes providing the parameters to generate the first RS at S520. The first RS may be generated by a wireless device other than the network device or by the network device itself. In each case, the parameters are provided to an RS-generating part of the wireless device or the network device. The parameters may be provided to the wireless device or network device by being transmitted explicitly or implicitly, such as using a reference (e.g., pointer) to pre-agreed, pre-stored or pre-communicated values.

The second RS may be made of a single segment or may be made of two or more segments. If the second RS is made of plural segments, the segments of the second RS may cover different sets of frequencies than the first segments (to be generated based on the parameters). In other words, a set of frequencies covered by any first segment is different from any set of frequencies covered a segment of the second RS. If a first segment covers a same set of frequencies as a segment of the second RS, then the base sequence root index of the first segment may be different from the base sequence root index characterizing the respective segment of the second RS. However, if a first segment covers a same set of frequencies as a segment of the second RS and is characterized by a same base sequence root index as the segment of the second RS, then a non-zero phase shift between the first segment and the second segment may be determined and included in the parameters. This includes in particular that a first phase shift is determined for the first segment and a second phase shift, with a different value than the first phase shift, is determined for the segment of the second RS.

The base sequence root index q may be associated with a ZC sequence of length $N_{ZC}$ so that $q \in \{0, 1, \ldots, N_{ZC}-1\}$. The base sequence for the first segments may be calculated according to formula (1). The ZC sequence length $N_{ZC}$ may be the largest prime number less than or equal to a number of frequencies $N_{RS}$ (e.g., less than or equal to a number of subcarriers) in the set of frequencies covered by the first segment, and if $N_{ZC} < N_{RS}$ then the ZC sequence is extended to match $N_{RS}$ according to $X_q = Z_q$ (k mod $N_{ZC}$) with $k \in \{0, 1, \ldots, N_{RS}-1\}$. Alternatively, $N_{ZC}$ may be a (optionally smallest) prime number larger than a number of frequencies in a set of frequencies covered by a first segment, and the ZC sequence is then truncated to a length equal to $N_{RS}$. Both ways, $N_{ZC}$ is said to be related to $N_{RS}$.

If the second RS is made of plural segments, and a first segment covers a same set of frequencies and has the same base sequence root index as a second segment, then the base sequence root index of the first segment may be made related to a ZC length different from a ZC length corresponding to the base sequence root index of the respective second segment.

In one embodiment, the first segments are associated with ordinal numbers (e.g., the order depending on frequency values in the set of frequencies), and the base sequence root index q for one of the first segments associated with an ordinal number i is $q = 1 + (i \cdot P) \mod(N_{ZC}-1)$, P being a predetermined integer.

If two or more first segments have a same number of frequencies in the respective distinct set of frequencies, they are called same-length segments. The parameters may be determined such that the same-length segments are characterized by different base sequence root indices. If the number of same-length segments is larger than a number of different base sequence root indices, the same-length segments that have assigned a same base sequence root index have a non-zero phase shift there-between.

The same network device may also determine other parameters for generating third segments of a third RS to be generated by a second network device different from a first network device generating the RS. The second RS may be received by a second transmission point interfering with the first transmission point. The other parameters include at least a third base sequence root index for at least one segment among the third segments, and are determined using information about the first RS and/or the second RS, which are to be received substantially simultaneously with the third RS at a second transmission point of the wireless network. The parameters are determined such that to limit correlation between the third and at least one of the first and the second RS.

Method 500 may further include providing RS configuration data to enable obtaining sets of frequencies corresponding to the first segments. In other words, the structure of the first RS is specified by the RS configuration data. Configuration data may include explicitly the sets of frequencies, or ranges of frequencies and lengths of the segments. In one embodiment, the RS configuration data may include a pointer to a predetermined RS configuration (e.g., b=0, b=1, or b=2, in FIG. 4). The RS configuration data may be included in a grant or an assignment scheduling a data transmission.

Figure 6:
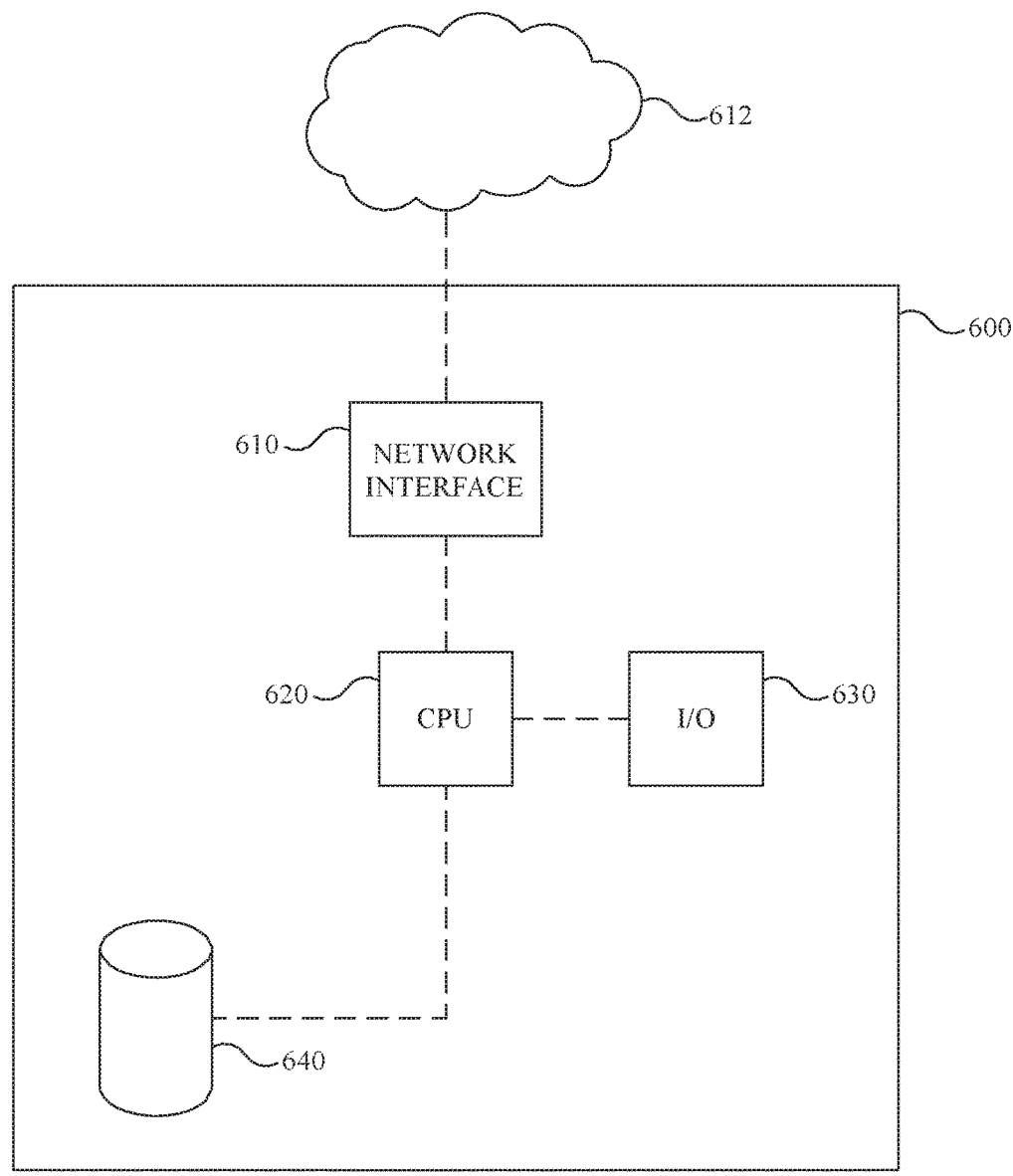
FIG. 6 illustrates a network device according to an embodiment.

FIG. 6 is a schematic diagram of a network device according to an embodiment. Such a network device is part of server or core-type devices (e.g., base stations) performing functions related to various network services. Network device 600 includes a network interface 610 configured to transmit and receive signals/data from other devices in the wireless communication system 612. Network interface 610 is connected to a processing unit 620 including at least one processor and configured to control interface 610. The processing unit 620 is configured to perform method 500 and/or variations thereof described in this document.

Network device 600 may also include a user interface 630 and a memory 640. Memory 640 may store executable codes which, when executed by processing unit 620, make the processing unit perform methods according to various embodiments.

Figure 7:
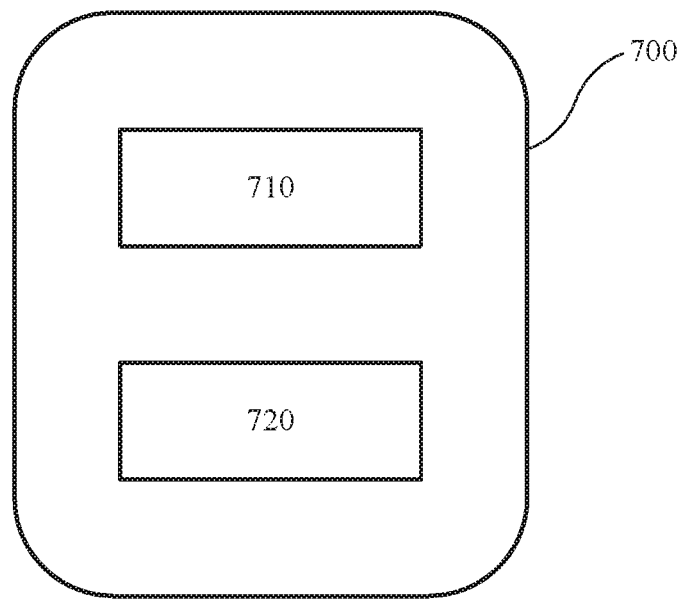
FIG. 7 is a diagram of a network device according to another embodiment.

FIG. 7 is a diagram of a network device 700 according to another embodiment. The network device includes hardware and/or software modules. An RS design module 710 determines parameters of first segments of a first RS. A delivery module 720 provides the parameters to generate the first RS including the first segments.

Figure 8:
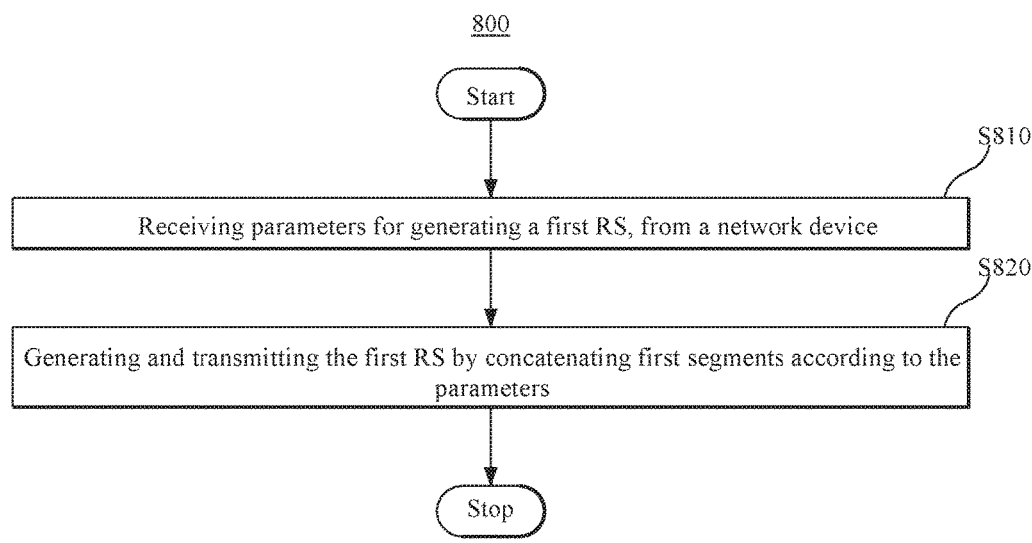
FIG. 8 illustrates a method performed by a wireless device according to an embodiment.

FIG. 8 is a flowchart of a method 800 for a wireless device in a communication network. Method 800 includes receiving parameters for generating a first RS, from a network device, at S810. Method 800 further includes generating and transmitting the first RS by concatenating first segments generated according to the parameters, at S820. The parameters include at least a base sequence root index determined for a first segment. Each of the first segments covers a distinct set of frequencies. The parameters have been determined using information about at least a second RS, which is to be received substantially simultaneously with the first RS at a transmission point of the wireless network, such that to limit correlation between the first RS and the second RS.

The parameters may further include a phase shift for the first segment. Alternatively or additionally, the parameters may include at least another base sequence root index for another one of the first segments, and/or a phase shift for the other segment. The phase shift may be one of N supported phase shift values $2\pi n/N$, where $n \in \{0, 1, N-1\}$, N depending on a traveling time between sources of reference signals and the transmission point. In particular, N may depend on a measured or estimated channel delay spread. The parameters may include an integer value j where $j \in \{0, 1, \ldots, N-1\}$, and the wireless device may then calculate the phase shift as $2\pi j/N$. Alternatively, the wireless device calculates the phase shift as $\varphi=2\pi p/N$, where $p=(j+L)$ mod N, L being a predetermined integer specific to the wireless device. Parameter L corresponds to the previous discussed values $L_i$ viewed here for one wireless device and one segment. Thus, L may be the same or different from values in other wireless devices, depending on whether the device is correlated or uncorrelated with the other devices.

The base sequence root index q is associated with a ZC sequence of length $N_{ZC}$ so that $q \in \{0, 1, \ldots, N_{ZC}-1\}$.

Method 800 may further include receiving RS configuration data that enables obtaining the sets of frequencies corresponding to the first segments. Method 800 and its variations may be related to an uplink RS or to a downlink RS.

Figure 9:
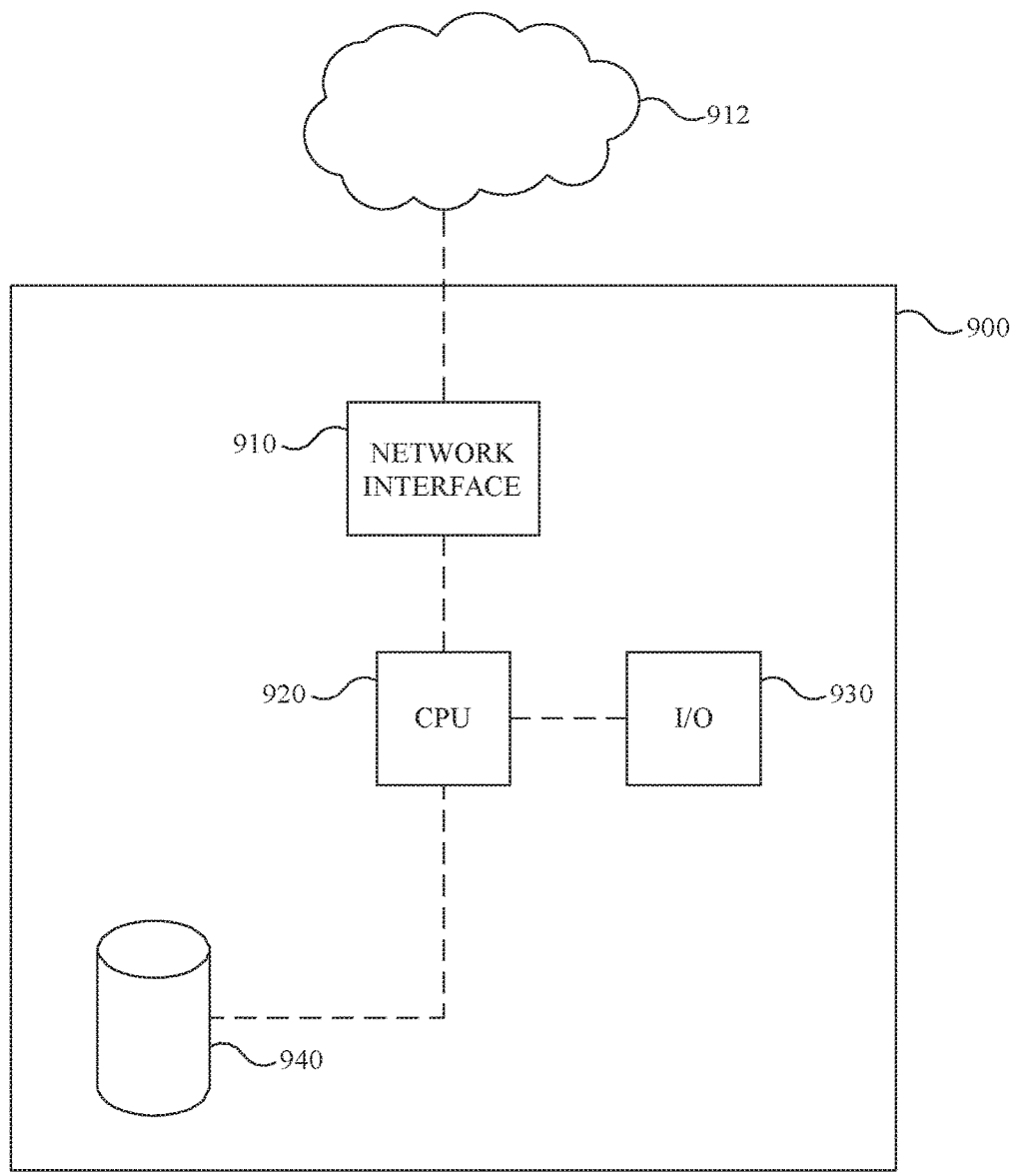
FIG. 9 illustrates a wireless device according to an embodiment.

FIG. 9 is a schematic diagram of a wireless device 900 able to perform method 800 and its variations. Such a wireless device is a network client receiving services via the network. The similar appearance of devices 600 and 900 is due to the fact that FIGS. 6 and 9 are schematic diagrams obscuring differences of substance related to the emitted powers, antenna structures and coverage, number of processors, memory capacity, other processes that run in parallel to the claimed methods in the network device and the wireless/client device.

Wireless device 900 includes a network interface 910 configured to transmit RS signals and to receive parameters from the network device as well as communicating with other devices in the wireless communication system 912. Network interface 910 is connected to a processing unit 920 configured to control interface 910 and to use the parameters to generate the first RS. Wireless device 900 may also include a user interface 930 and a memory 940. Memory 940 may store executable codes which, when executed by processing unit 920, make the processing unit perform methods according to various embodiments.

Figure 10:
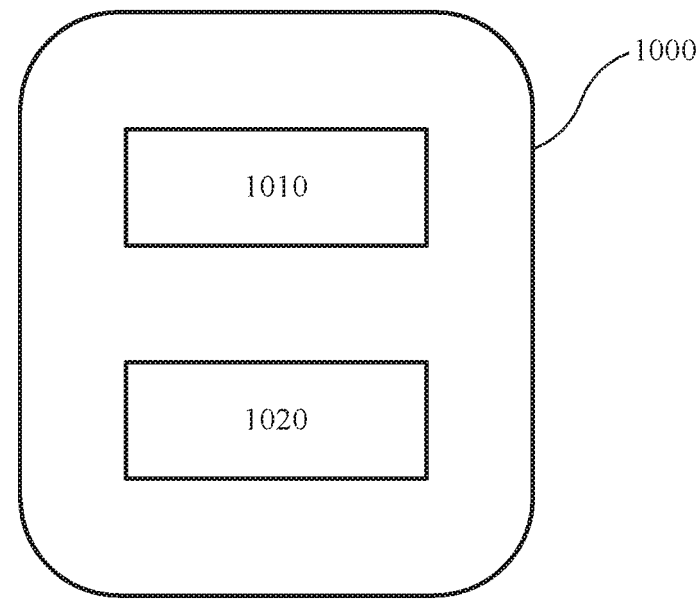
FIG. 10 is a diagram of a wireless device according to another embodiment.

FIG. 10 is a diagram of a wireless device 1000 includes hardware and/or software modules according to another embodiment. Wireless device 1000 has a receiver module 1010 for receiving parameters related to generating a first RS, from a network device. Wireless device 1000 also has an RS-generating module 1020 that generates and transmits first segments of the first RS, according to the parameters. The parameters include at least a base sequence root index determined for one of the first segments.

The advantage of these embodiments is the ability to schedule partially overlapping users while maintaining good cubic metric properties of the reference signal. In some embodiments, cross-correlation between transmissions of reference signals originating from different transmission points is also improved by coordinating the assignments of the block reference signal structure for said transmission points.

The embodiments disclosed in this section provide methods and network devices that design RSs such as to limit correlations between RSs received at the same transmission point and to reduce the cubic metric of the RSs. No additional hardware is necessary to implement these methods in existing network devices. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A method performed by a network device in a wireless network, the method comprising:
    determining parameters for generating first segments of a first reference signal, RS, each of the first segments covering a distinct set of frequencies, the parameters including at least a base sequence root index for one of the first segments, and being determined using information about at least a second RS which is to be received substantially simultaneously with the first RS at a transmission point of the wireless network, so as to limit correlation between the first RS and the second RS; and
    providing the parameters to generate the first RS including the first segments to an RS-generating part of a wireless device or the network device.

2. The method of claim 1, wherein the parameters further include a phase shift for said one of the first segments.

3. The method of claim 1, wherein the parameters include at least another base sequence root index for another one of the first segments.

4. The method of claim 3, wherein the parameters further include a phase shift for said one of the first segments and/or the other one of the first segments.

5. The method of claim 1, wherein the parameters are determined so as to limit a cubic metric or a peak-to-average ratio of the first RS.

6. The method of claim 1, wherein the second RS is made of a single segment.

7. The method of claim 1, wherein
    the second RS includes at least two second segments, and
    a set of frequencies covered by any one of the first segments is different from a set of frequencies covered by any one of the second segments.

8. The method of claim 1, wherein
the second RS includes at least two second segments, and
the determining of the parameters includes
if a segment among the first segments covers a same set of frequencies as one segment among the second segments, then the base sequence root index of the segment is different from a base sequence root index characterizing the one segment among the second segments.

9. The method of claim 1, wherein
the second RS includes at least two second segments, and
the determining of the parameters includes
if a segment among the first segments covers a same set of frequencies as one of the second segments and is characterized by a same base sequence root index as the one of the second segments, determining and including in the parameters a phase shift for the segment relative to the one of the second segments.

10. The method of claim 1, wherein the base sequence root index q is associated with a Zadoff-Chu sequence of length $N_{zc}$, with $q \in \{0,1,\ldots,N_{zc}-1\}$.

11. The method of claim 10, wherein
the second RS includes at least two second segments, and
the determining of the parameters includes
if a segment among the first segments covers a same set of frequencies as one of the second segments and has the same base sequence root index as the one of the second segments, then a Zadoff-Chu sequence length related to the base sequence root index of the segment is different from a Zadoff-Chu sequence length related to the base sequence root index of the one of the second segments.

12. The method of claim 10, wherein a base sequence having the base sequence root index q and the base sequence length $N_{zc}$, is calculated as $$Z_q(k) = e^{-j2\pi q \frac{k(k+1)/2}{N_{ZC}}}$$

where $k \in \{0,1,\ldots,N_{zc}-1\}$.

13. The method of claim 10, wherein $N_{zc}$, is a largest prime number less than or equal to a number of frequencies $N_{RS}$ in a set of frequencies covered by an segment, and if $N_{zc} < N_{RS}$ then the Zadoff-Chu sequence is extended to match $N_{RS}$ according to $X_q = Z_q$ (k mod $N_{zc}$) with $k \in \{0,1,\ldots,N_{RS}-1\}$.

14. The method of claim 10, wherein $N_{zc}$, is a prime number larger than a number $N_{RS}$ of frequencies in a set of frequencies covered by an segment and the Zadoff-Chu sequence is truncated to a length equal to $N_{RS}$.

15. The method of claim 10, wherein
the first segments are associated with ordinal numbers, and
the base sequence root index q for one of the first segments which is associated with an ordinal number i, is $q = 1 + (i \cdot P) \mod (N_{zc} - 1)$, P being a predetermined integer.

16. The method of claim 15, wherein the ordinal number depends on frequency values in the set of frequencies.

17. The method of claim 1, wherein
at least two same-length segments among the first segments have a same number of frequencies in the respective distinct set of frequencies, and
the parameters are determined such that the at least two same-length segments are characterized by different respective base sequence root indices.

18. The method of claim 1, wherein
the first segments include a number of same-length segments that have a same number of frequencies in the respective distinct set of frequencies,
the number of same-length segments is larger than a number of different base sequence root indices, and
the parameters include base sequence root indices for the same-length segments, the base sequence root indices being determined such that
any of the different base sequence root indices is assigned to at least one of the same-length segments, and
any two segments among the same-length segments that have assigned a same base sequence root index have a non-zero phase shift there-between.

19. The method of claim 1, the method further comprising:
determining other parameters for generating third segments of a third RS to be generated by a second network device different from a first network device generating the first RS, each of the third segments covering a distinct second set of frequencies, the other parameters including at least a third base sequence root index for at least one segment among the third segments, and being determined using information about the first RS and/or the second RS, which are to be received substantially simultaneously with the third RS at a second transmission point of the wireless network.

20. The method of claim 1, further comprising:
providing RS configuration data to enable obtaining sets of frequencies corresponding to the first segments.

21. The method of claim 20, wherein the RS configuration data includes a pointer to one of predetermined RS configurations.

22. The method of claim 20, wherein the RS configuration data is included in a grant or an assignment scheduling a data transmission.

23. A network device, comprising:
a communication interface configured to transmit and receive data via a wireless network; and
a processing unit connected to the communication interface and including at least one processor, the processing unit being configured
to determine parameters for generating first segments of a first reference signal, RS, each of the first segments covering a distinct set of frequencies, the parameters including at least a base sequence root index for one of the first segments, and being determined using information about at least a second RS which is to be received substantially simultaneously with the first RS at a transmission point of the wireless network, so as to limit correlation between the first RS and the second RS, and
to provide the parameters for generating the first RS including the first segments to an RS-generating part of a wireless device or the network device.

24. A method for a wireless device in a communication network, the method comprising:
receiving parameters for generating a first reference signal, RS, from a network device; and
generating and transmitting the first RS by concatenating first segments generated according to the parameters that include at least a base sequence root index determined for an RS segment among the first segments, wherein each of the first segments covering a distinct set of frequencies, and the parameters have been determined using information about at least a second RS, which is to be received substantially simultaneously with the first RS at a transmission point of the wireless network, so as to limit correlation between the first RS and the second RS.

25. The method of claim 24, wherein the parameters further include a phase shift for the RS segment.

26. The method of claim 24, wherein the parameters include at least another base sequence root index for another RS segment among the first segments.

27. The method of claim 25, wherein the parameters include an integer value $j \in \{0,1,\ldots,N-1\}$, and the wireless device calculates the phase shift as $$\varphi = 2\pi \frac{p}{N},$$

where $p=(j+L)\bmod N$, L being a predetermined integer specific to the wireless device.

28. The method of claim 24, further comprising:
receiving RS configuration data to obtain sets of frequencies corresponding to the first segments.

29. The method of claim 28, wherein the RS configuration data is included in a grant or an assignment scheduling a data transmission related to the wireless device.

30. The method of claim 24, wherein the first RS is an uplink RS.

31. The method of claim 24, wherein the first RS is a downlink RS.

32. A wireless device in a communication network, the wireless device comprising:

a communication interface configured to transmit a first reference signal, RS, and to receive parameters related to generating the first RS from a network device; and a processing unit connected to the communication interface and configured to generate the first RS by concatenating first segments according to the parameters that include at least a base sequence root index determined for an RS segment among the first segments, wherein each of the first segments is characterized by a base sequence root index and covers a distinct set of frequencies, and the parameters have been determined using information about a second RS, which is to be received substantially simultaneously with the first RS at a transmission point of the wireless network, so as to limit correlation between the first RS and the second RS.

* * * * *